(12) United States Patent
Clabburn (10) Patent No.: US 6,724,535 B1
(45) Date of Patent: Apr. 20, 2004

(54) STEPPED SURFACE DIFFUSER (75) Inventor: Robin Clabburn, Swindon (GB)

(73) Assignee: Microsharp Corporation Limited (GB)

( * ) Notice: Subject to any disclaimer, the term of this patent is extended or adjusted under 35 U.S.C. 154(b) by 0 days.

(21) Appl. No.: 09/869,600

(22) PCT Filed: Dec. 24, 1999

(86) PCT No.: PCT/GB99/04432

§ 371 (c)(1),
(2), (4) Date: Oct. 12, 2001

(87) PCT Pub. No.: WO00/41009

PCT Pub. Date: Jul. 13, 2000

(30) Foreign Application Priority Data

Dec. 31, 1998 (GB) ................................................ 9828869
Jan. 29, 1999 (GB) ................................................ 9902042

(51) Int. Cl.$^7$ .......................... G02B 27/10; G02B 5/04; G02B 21/26; G02B 13/20; G02F 1/1335
(52) U.S. Cl. ........................ 359/619; 359/615; 359/454; 359/457; 359/599; 359/707; 359/742; 349/5; 349/95; 349/111
(58) Field of Search .................................. 359/619, 620, 359/652, 615, 655, 454, 455, 456, 457, 459, 463, 520, 537, 599, 741, 742, 743, 707; 349/5, 75, 84, 95, 111, 112, 113; 430/5, 321

(56) References Cited

U.S. PATENT DOCUMENTS

| 4,911,529 | A | * | 3/1990 | Van De Ven | 359/454 |
| 5,062,688 | A | * | 11/1991 | Okuda et al. | 359/619 |
| 5,442,482 | A | * | 8/1995 | Johnson et al. | 359/619 |
| 5,581,407 | A | * | 12/1996 | Mitani et al. | 359/619 |
| 6,130,777 | A | * | 10/2000 | Yamashita et al. | 359/456 |

FOREIGN PATENT DOCUMENTS

GB 2314943 A 1/1998

\* cited by examiner

*Primary Examiner*—Loha Ben
(74) *Attorney, Agent, or Firm*—Webb Ziesenheim Logsdon Orkin & Hanson, P.C.

(57) ABSTRACT

An optical device such as an overlay panel for a LCD display, comprises an element of light-transmitting material having a surface configured to form a stepped Fresnel prismatic structure. The light-transmitting material itself or ribbed light refracting element, said element incorporates an array of graded refractive index features adapted to impart light dispersing of diffusing characteristics to the light-transmitting material. In an alternative arrangement, the element of light-transmitting material has a layer configured to form a stepped Fresnel-type surface and an additional layer incorporating such an array of graded refractive index features.

19 Claims, 6 Drawing Sheets

STEPPED SURFACE DIFFUSER

BACKGROUND OF THE INVENTION

The present invention relates to a light diffusing sheet material having utility in various fields, including that of enhancing video displays, such as LCD displays.

In liquid crystal displays the bright image seen by the viewer is generated through the liquid cell either by light generated within the assembly by a back light or by the use of ambient light which is first transmitted through the cell and reflected at the rear of the cell, re-emerging through the cell to create a bright image. In this latter arrangement, due to the position of the viewer, the majority of light must be accepted off axis, preferably should not be further diffused on entering the display, and should preferably re-emerge on axis with some additional diffusion in order to provide an acceptable viewing cone. It is well known that Fresnel-like structures have the ability to redirect light; as circular arrangements of facets to create lenses, or as linear arrangements of facets to create off axis effects. Structures of these types have been proposed incorporating materials with light diffusing characteristics, as described in U.S. Pat. No. 4,911,529, where the diffusive effect is provided by a so-called bulk diffuser comprising small particles of a material of a first refractive index dispersed in a matrix material of a second refractive index. Such materials are described in, for example U.S. Pat. No. 4,983,016, EP-A-0464499 or EP-A-0843203. An important characteristic of such bulk diff-user materials is that the amount of diffusion taking place within a given composition is dependent on the thickness of material through which the light travels. As a result, light entering an assembly containing such material off axis becomes more diffuse and reduced in intensity than light which enters on axis.

SUMMARY OF THE INVENTION

According to the present invention there is provided an optical device comprising an element of light-transmitting material having a surface thereof configured to form a stepped, Fresnel-type light refracting element, such light transmitting material incorporating an array of integral graded refractive index structures adapted to impart light dispersing or diff-using characteristics to said light-transmitting sheet material or the element having a layer configured to form said stepped surface and an additional layer incorporating such an array of integral graded refractive index structures.

In certain instances, it may be desirable to render one surface of said element reflecting or partially reflecting by coating with a material with the necessary optical properties, such as a metal applied by deposition or sputtering.

The sheet material may comprise, for example, a photopolymer, in which the graded refractive index features are formed by exposure of a precursor of the material, (such as a monomer) to appropriate radiation in a predetermined pattern so as to produce localised variations of light intensity within the material and hence localised variations in degree of polymerisation and thus in refractive index. As another example, the material may be dichromated gelatine (DCG), in which the desired graded refractive index features are formed by exposure of the material itself to such a radiation pattern, to produce an equivalent effect. Such materials, correctly processed, possess the previously described desirable optical characteristics. The process techniques used may, for example include, those disclosed in EP-0294122 or EP-0801767 or U.S. Pat. No. 5,695,895 or GB-A-1499135. These types of diffusing materials may themselves have off axis or asymmetric characteristics, as described in EP 0768565, which can further enhance the off axis effects generated by the Fresnel structure. Methods of producing sheets of light diffusing material in which the light-diffusing characteristics are due to refractive index variations within the material are known and will not be discussed in greater detail here. These known methods, however, are directed to the production of either planar light-diffusing sheets or light-diffusing sheets having a surface configuration in the form of a plurality of convex domes, for example, adapted to enhance the diffusive characteristics of the material.

BRIEF DESCRIPTION OF THE DRAWINGS

Embodiments of the invention are described below with reference to the accompanying drawings, in which.

In the embodiments of the present invention shown in the drawings, the device has the general form of a sheet 13 of light diffusing material, one surface of which is provided with a stepped or grooved configuration, after the fashion of a Fresnel lens or prism. As a result, the device, in addition to its diffusive characteristics, also has a directional characteristic in the sense that, if a parallel beam of light is directed on the sheet from one side thereof, the polar distribution of the diffused light emerging from the device has a peak along a direction which differs from the direction of the axis of the incident beam by an angle representative of the deviation imparted by the prismatic component due to the Fresnel prism surface configuration. The stepped surface of the device has, in cross-section, as shown in the Figures, a saw-tooth profile section, comprising major facets or ramps inclined typically at 10° to 20° to the general plane of the sheet, and minor facets extending generally perpendicular to said plane.

DETAILED DESCRIPTION OF THE INVENTION

In the example shown in FIG. 1, a light beam entering the material from below, normal to the (planar) lower surface is shown as passing through the material undeviated to pass through one of the facets of the Fresnel structure forming the upper surface, to be refracted through a 5° angle. In the example shown, the Fresnel structure comprises a series of major facets each inclined at 10° to the plane of the lower surface. It will, of course, be understood that these figures are merely exemplary. It will also be understood that the illustration of FIG. 1 neglects the diffusive effect of the material. Taking this effect into account, it will be appreciated that the overall effect, for a parallel beam entering the material along the ray path indicated, is to produce, within the material, a spreading or scattering of light in a polar distribution with an intensity peal, along the ray path shown.

Figure 1:
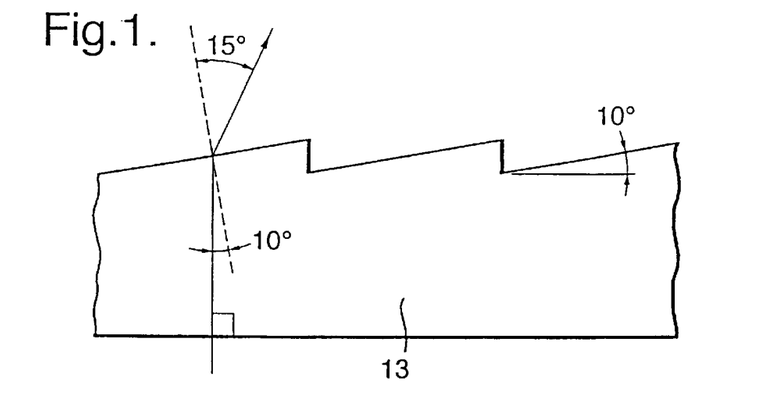
FIG. 1 is a view, in section perpendicular to the plane of major extension of the material, of a first embodiment of the invention.
Figure 1A:
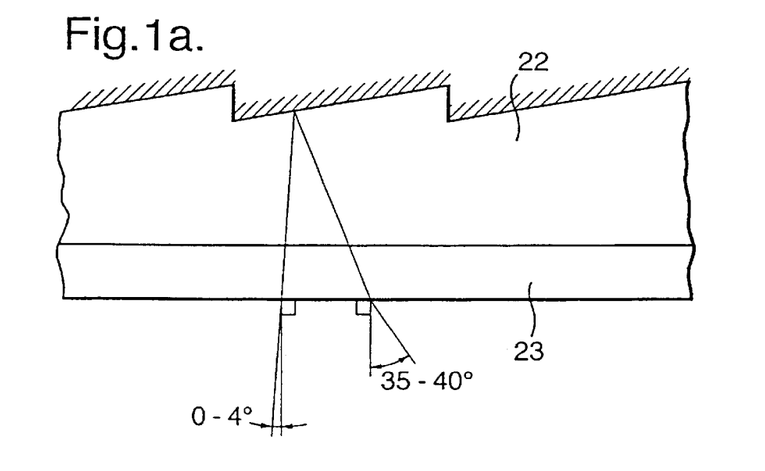
FIGS. 1a and 1b are corresponding views of variants each having a reflective coating.
Figure 1B:
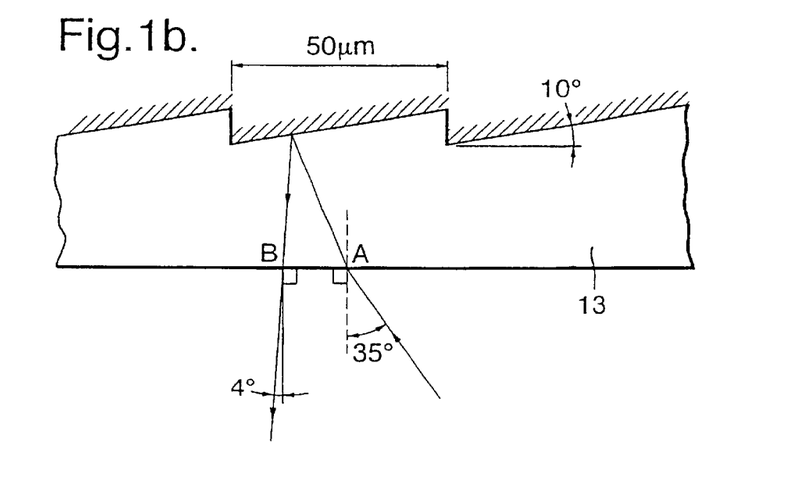

Referring to FIG. 1b, an arrangement is shown which is similar to that of FIG. 1 except that the stepped upper surface is rendered reflective, for example by metallisation e.g. applied by vapour deposition or by sputtering. The incorporation of a reflecting surface removed from the surface through which the light enters the assembly, causes the light, initially entering the material from below at a significant (35°–40°) angle to the normal, to be reflected at the reflective facets, passing through the material a second time to become more diffuse before emerging substantially on axis, that is to say emerging as a dispersing "bundle" of rays in a distribution having a maximum along the normal to the planar face. In some embodiments, the reflecting surface may be only partially light reflecting and may be partially light transmitting, instead of being fully light reflecting. Such a "transflective" material can be useful eg. with displays which can be alternatively front-lit or back-lit.

FIG. 1a shows an arrangement similar to that of FIG. 1b, except that the light transmitting layer provided with the Fresnel-faceted surface (and which layer is indicated at 22 in FIG. 1a) is of non-diffusive, transparent material and the desired diffusive effect is provided by an additional layer, referenced 23, of light-diffusing material. In the embodiments of FIGS. 1a and 1b described above, in which reflecting coating is used, that coating is applied to the corrugated or faceted surface of the material, arranged as the rear surface of the screen, in order to secure a more pronounced off-axis effect. However, the reflective coating may, of course, be applied to the flat surface of the device, again arranged as the rear surface.

Figure 2:
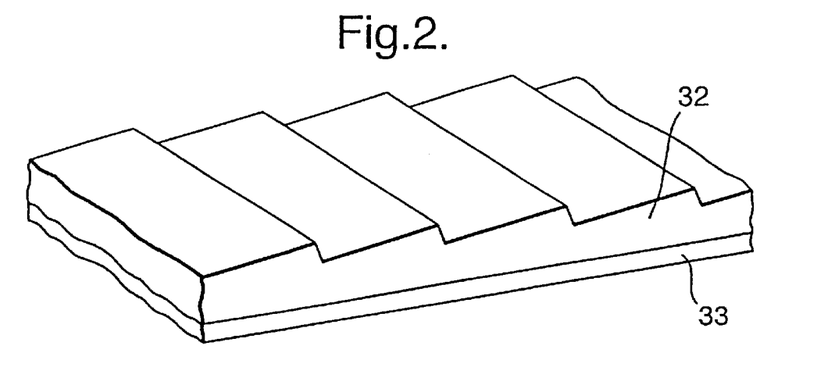
FIG. 2 is a view, partly in section and partly in perspective of another form of light-diffusing sheet in accordance with the invention.

FIG. 2 shows, partly in section and partly in perspective, a light-diffusing, light-transmissive sheet in accordance with the invention, comprising a layer 32 having a Fresnel stepped or faceted surface, and a flat substrate layer 33. The layer 32 may be of light-diffusing material and substrate 33 of transparent non-diffusive material, such as polyester or polycarbonate, or, similarly to the arrangement of FIG. 1a, the layer 32 may be non-diffusive and the layer 33 diffusive.

Figure 2A:
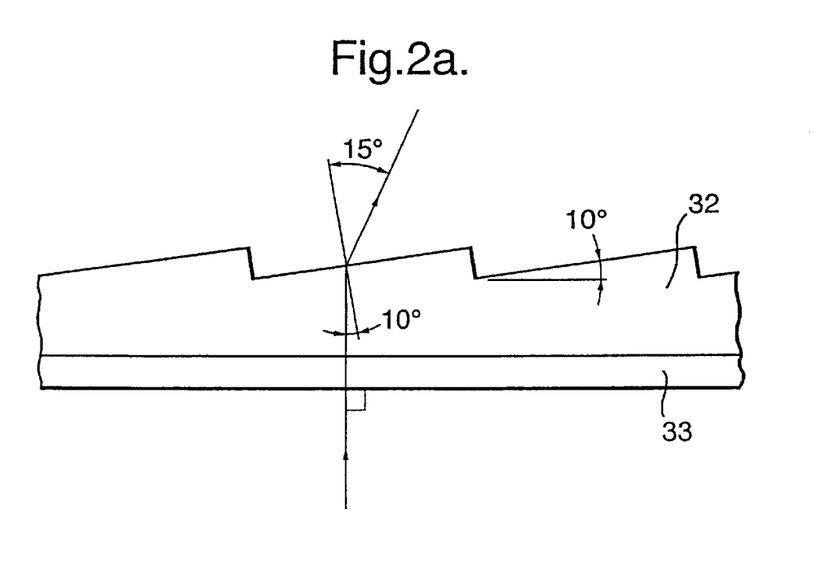
FIGS. 2a and 3, 3a and 3b are sectional views similar to FIG. 1, showing specific examples of materials in accordance with the invention.

FIG. 2a shows a specific example of an arrangement corresponding to that of FIG. 2 wherein the Fresnel structure has a pitch of 50 microns and a facet angle of 10 degrees. Again, neglecting, initially, the diffusive characteristics of the material, a light beam entering on axis (i.e. normal to the "plane" of the material), exits at 5° to the normal.

Figure 3:
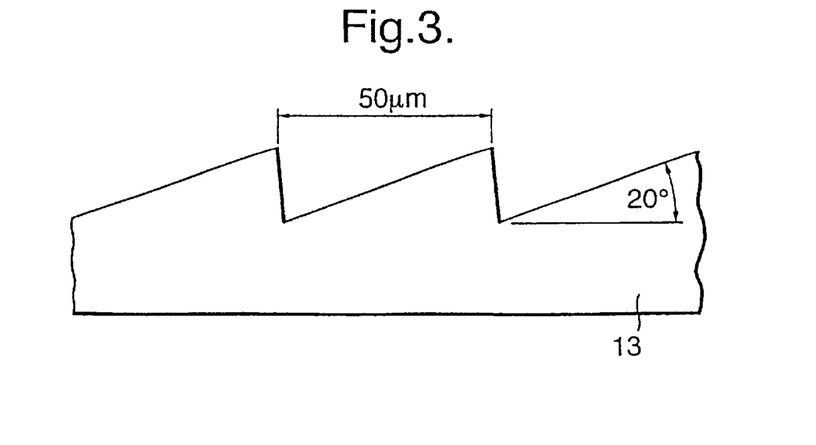
Figure 3A:
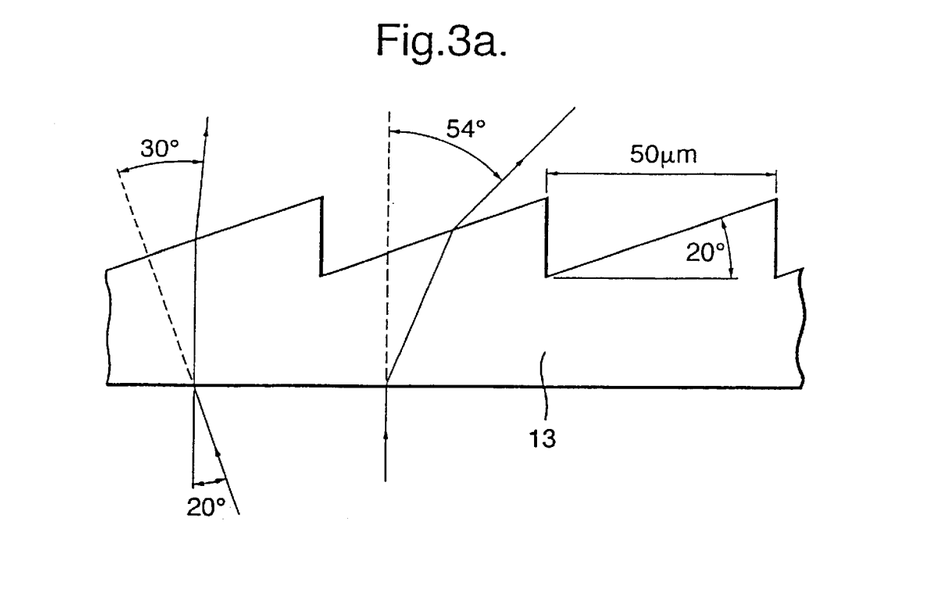
Figure 3B:
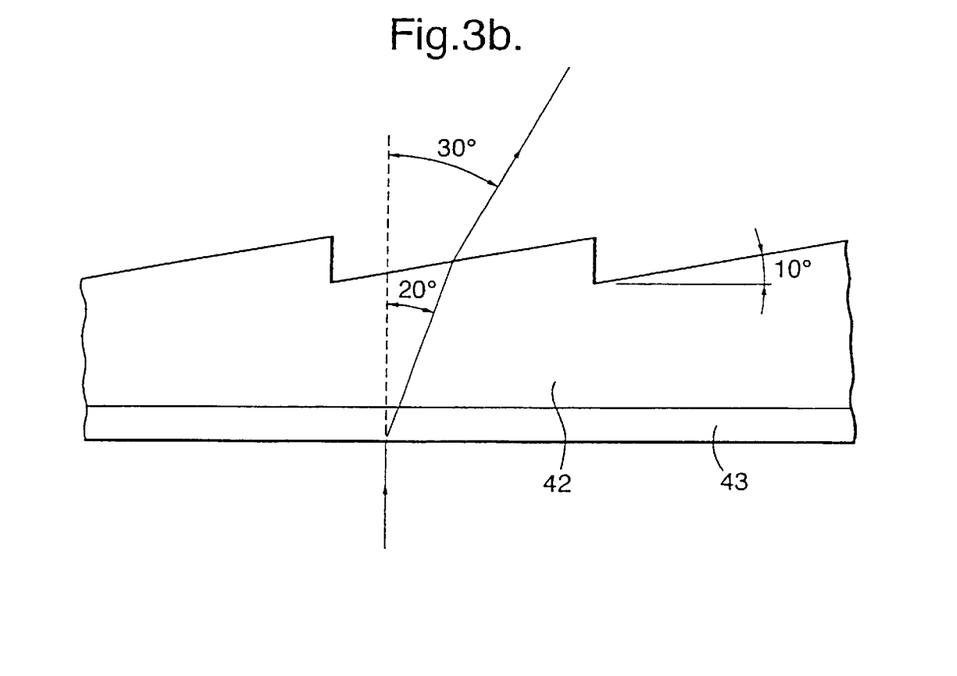

FIG. 3 shows an embodiment similar to that of FIG. 1 and having, by way of example, a Fresnel structure the pitch of which is 50 microns with a facet angle of 20 degrees. FIG. 3a shows a structure of the same pitch and facet angle, and shows additionally, for illustration, different ray paths through the light diffusing material 13. FIG. 3b shows a structure similar to that of FIG. 2a, but in which, however, the substrate layer, referenced 43, is a layer incorporating graded refractive index features arranged to impart a net deflective effect upon light passing therethrough as well as, typically, diffusing the light passing therethrough. Thus, in the example illustrated, light entering the layer 43 normal to its exposed lower (in the figure) surface, is subjected to a net, or average deflection of 20°. The Fresnel-faceted layer referenced 42, in this case may simply be transparent and non-diffusive or may itself be light-diffusing.

The ray diagrams in FIGS. 1 to 3b, as noted, neglect, for ease of illustration, the fact that the light-transmitting layers of the device are not simply transparent, but that one or each such layer has a light-diffusing character.

Thus, in place of the emerging ray illustrated, there will, in practice, be a dispersing "bundle" of rays in a distribution having a maximum along the emerging ray path illustrated.

The stepped surface in the above embodiments may define, in effect, a plurality of precisely parallel similar V-section grooves extending across the sheet material so that, neglecting the diffusive features, the material acts as a tin prism. Alternatively, however, the grooves and ridges defined by the stepped surface may extend in circles or arcs and be of a form corresponding to that of the stepped surface of a Fresnel lens, whereby the refraction or reflection at the stepped surface will tend to "focus" the diffusive light provided thereby. In addition, the presence of the diffusing material will mask the discontinuities in the Fresnel structure to the viewer.

Figure 5A:
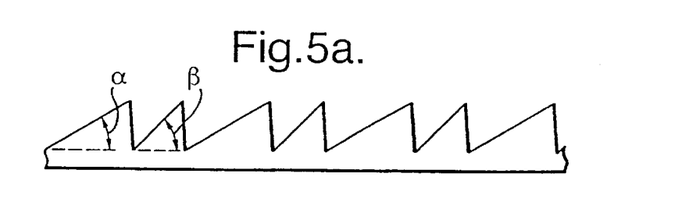
FIGS. 5a to 5h are diagrams similar to FIG. 1 showing various different ribbed profiles which may be adopted in embodiments of the invention.
Figure 5B:
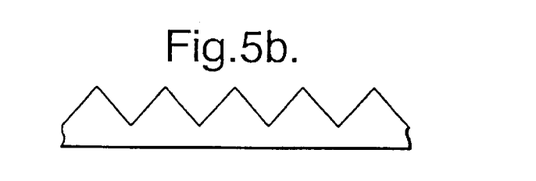
Figure 5C:
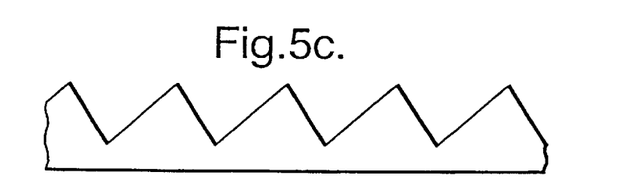
Figure 5D:
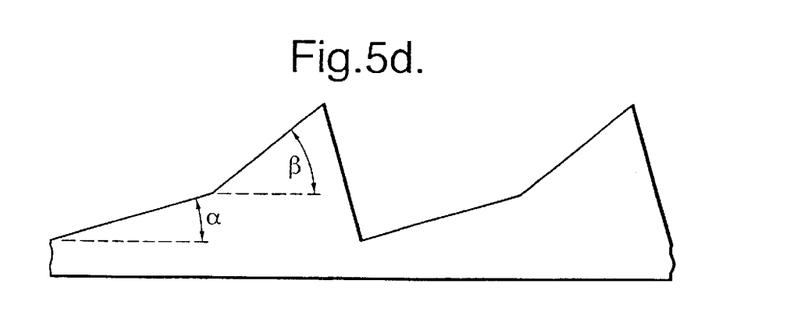
Figure 5E:
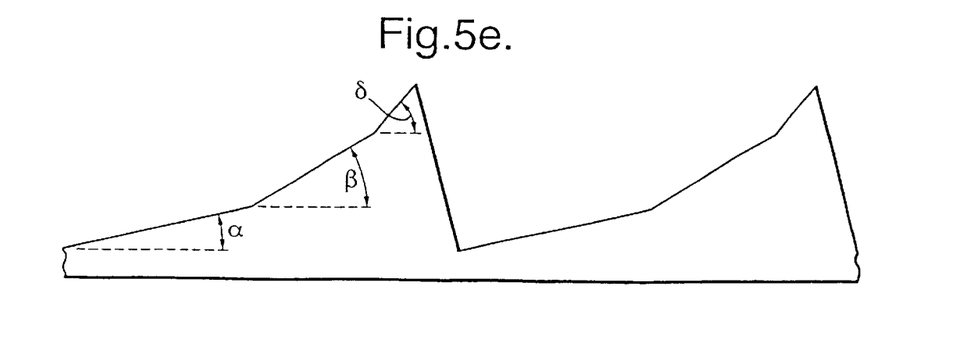
Figure 5F:
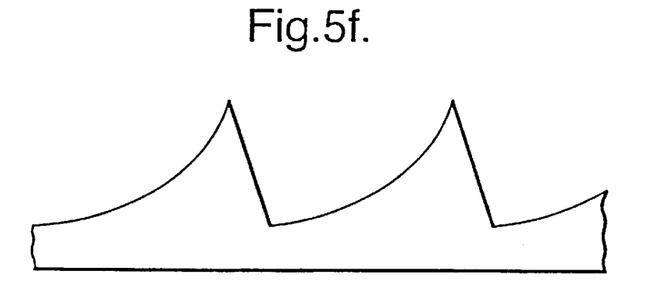
Figure 5G:
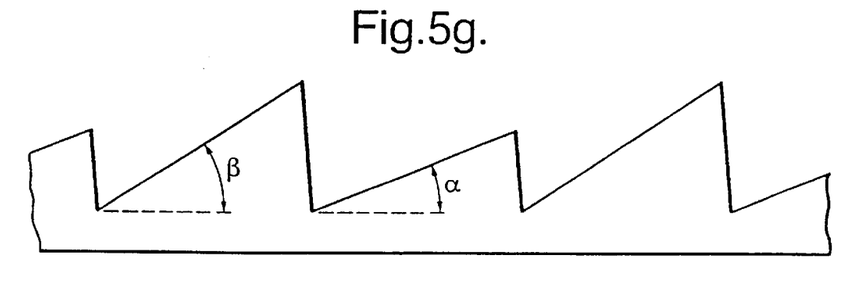
Figure 5H:
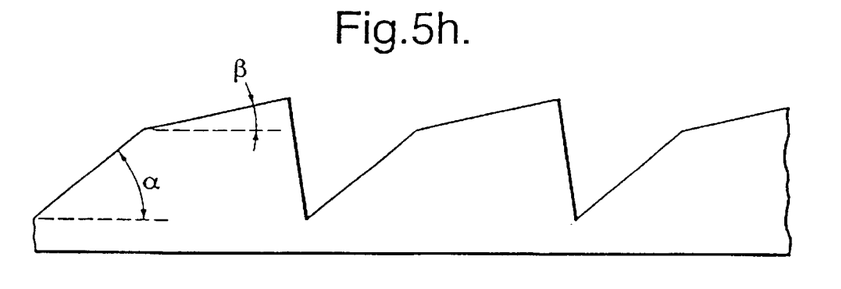

In the preferred embodiments discussed, the light diffusing character of the light diffusing layer arises as a result of incorporating an array of graded refractive index features, for example graded refractive index microlenses or other features. These graded refractive index microlenses preferably have each a transverse dimension, i.e. a dimension measured parallel with the major planes of the sheet, which is small in relation to the pitch of the corrugated surface, i.e. the spacing between, for example, peaks of adjacent ridges of the corrugated surface, the graded refractive index features being likewise closely spaced in relation to one another, so that, for example, the mean spacing between adjacent such features may be several orders of magnitude less than the pitch of the corrugations on the surface. In the examples discussed, the graded refractive index features typically have an average diameter of 5 microns spaced apart (centre to centre), by, for example, a distance of 8 microns. In each said graded refractive index feature, the refractive index may be substantially constant along any line perpendicular to the plane of the sheet but may vary with transverse position in the sheet material. Thus, in the case of a graded refractive index lens, the refractive index may vary with radial distance from the optical axis of the lens, as described in EP-A-0294122. In variants, however, the graded refractive index diffuser may have features aligned along axes which pass through the sheet material obliquely, so that whilst the refractive index may be substantially constant along any line parallel with such axes, and may vary with transverse position in a plane perpendicular to these axes, that plane will no longer be parallel with the plane of the material, and where the GRIN features are GRIN lenses, the principal axes of the lenses will be inclined to the perpendicular to the plane of the material. Such a variant graded refractive index diffuser may in general exhibit an off-axis diffusion characteristic of its own Whilst in FIGS. 1a to 3b, the ribs or grooves formed on the surface of the material are shown as a series of identical ribs of identical saw-tooth profile, the applicants have found that in some applications it can be advantageous to vary the rib profile over the sheet material. Thus, for example, as shown in FIGS. 5a to 5h, a wide variety of profiles may be adopted. For example, as shown in FIG. 5a, alternate ribs in the series may have major flanks of different inclinations α and β with respect to the general plane of die base surface of the sheet material, (herein referred to as the base plane), for example 8 degrees and 14 degrees, alternately. The crests of the ribs may be of the same height or of different heights, as shown in FIG. 5g. Again, as shown in FIG. 5h, where rib faces of two different inclinations α and β are provided, these need not be provided on different ribs but may be provided as sections of different inclinations on the same ribs as shown. Similarly, each of a series of identical ribs, for example, may each have two, three or more portions of the same rib surface with different inclinations α,β and δ with respect to the base plane, cf. FIG. 5e and FIG. 5h. Whilst the ribs may be of generally saw-tooth profile with one side inclined significantly to the base plane and the other side more or less perpendicular to the base plane,(eg. inclined at 2 to 5 degrees to the perpendicular to the base plane), in some applications the two sides of each rib may be more or less equally inclined to the base plane, for example, as shown in FIGS. 5b and 5c. Again, as illustrated in FIG. 5f, one,(or each), flank of each of selected ribs may be concavely curved, (see FIG. 5f), or convexly curved, (not shown). These measures make it possible to secure a product with a two-lobed or three-lobed diffusion characteristics, or with otherwise modified diffusion polar distributions.

The refractive index gradations in the light-diffusing material may be produced by photographic means, for example, by contact printing through an appropriate mask as described in EP-A-0294122. However, whereas in EP-A-0294122, for example, the optical mask utilised is preferably plane, for the purposes of the present invention, the optical mask may comprise, for example, a glass plate having the desired stepped configuration on one surface and having that one surface coated with a thin layer of, for example, metallic chrome, so thin as not to alter the corrugated character of the glass surface, the chrome layer being provided with an array of transparent windows or apertures etched therein by photo-etching techniques so as to form an optical printing mask. The stepped, chromed surface of the plate may then be pressed against the exposed surface of, for example, a layer of photopolymerisable monomer (destined to form the layer 33 of FIG. 2, for example) on a transparent substrate, so as to form the desired corrugations by what is effectively an embossing technique. Alternatively the photopolymerisable material may be cast on the stepped chromed surface. The layer of photopolymerisable monomer, still in contact with the glass plate or mask, may then be exposed to polymerising light through such mask. Thereafter, and after a subsequent blanket exposure to polymerising light, for example directed through the transparent substrate, the plate may be separated from the finished product. Alternatively, the diffuser/Fresnel lens or prism combination can be created a to step process; forming a planar diffuser as previously described then embossing the Fresnel structure into one surface using a combination of heat and some pressure. In this instance the embossing may be effected using a copper die, formed by machining the Fresnel structure into the surface of a copper plate using a diamond tool. Whilst the above description, and EP-A-0294122, make reference to the use of photopolymer as the material in which graded refractive index features are induced by exposure to appropriate light or other radiation, other materials in which refractive index variations can similarly be induced by such exposure, may be used utilising the same exposure techniques. Thus, for example, dichromated gelatine (DCG) may be used as the material in which graded refractive index lenses or other graded refractive index features are induced to impart light diffusing characteristics to the device.

It is preferable, particularly where the devices are to be used in conjunction with LCD displays, that the device in accordance with the invention or the several layers thereof, should be non-birefringent, i.e. should be polarisation-maintaining.

A particular use of a material in accordance with the invention is as an overlap for front-lit LCD displays in, for example, portable telephones, portable computers etc., to allow the user to view the display from the optimum angle without obstructing incident light and without being troubled by extraneous surface reflections. In such an application of course, no reflective coating is utilised and the or each layer of the diffusing screen should be light-transmitting. In an arrangement such as illustrated in FIG. 2, the substrate may be constituted by the, for example glass, cover plate of the LCD display.

Of equal significance are devices in accordance with the invention in which, as in FIGS. 1a and 1b above, one surface, usually the surface in which the Fresnel structure is present, is coated with a reflecting or partially reflecting coating, typically a metal such as aluminum. Devices of this type may be incorporated behind the liquid crystal cell in a display illuminated using ambient lighting.

Figure 4:
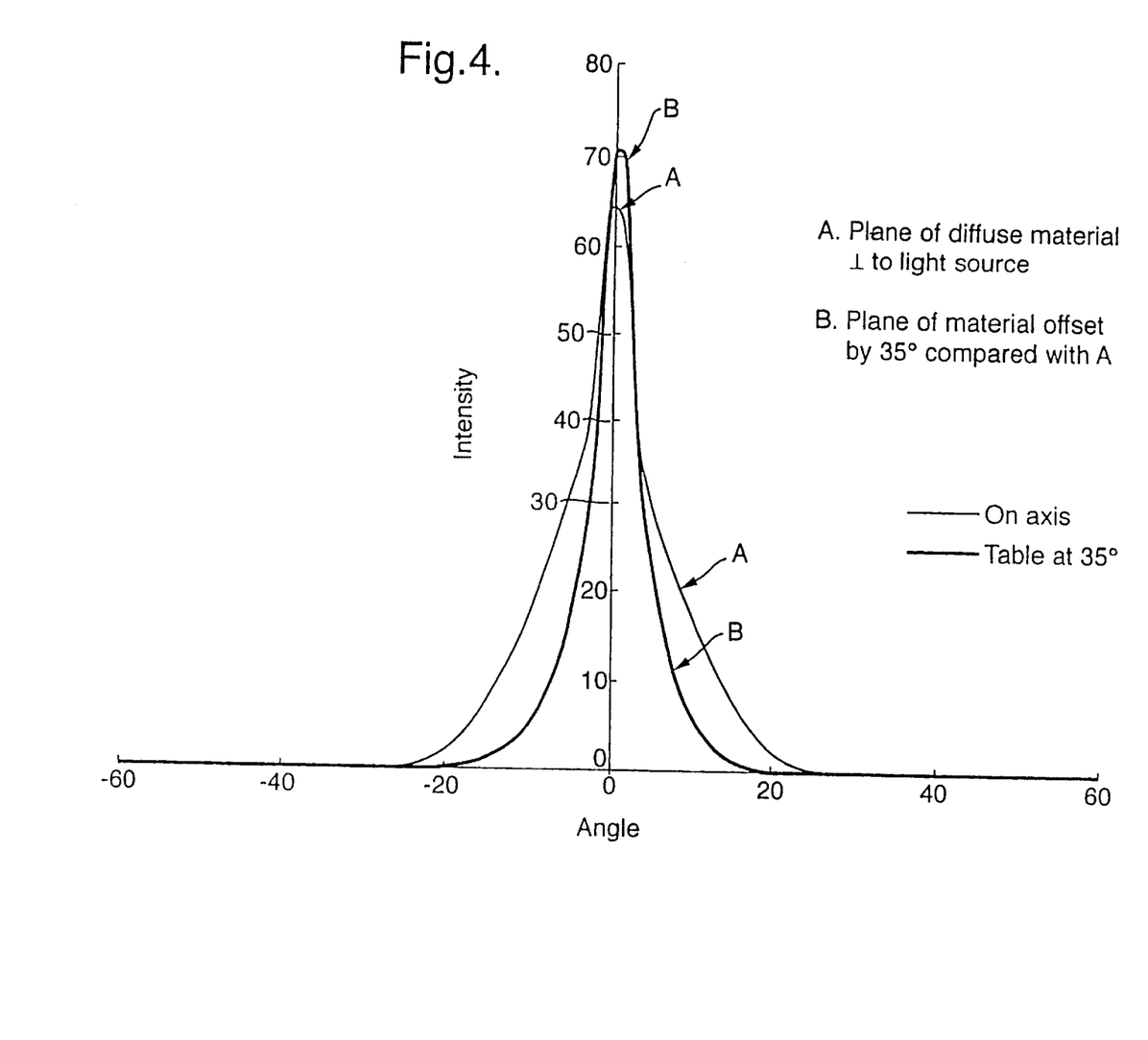
FIG. 4 is a graph showing diffusive characteristics for various materials.

In the arrangements of FIGS. 1a and 1b, light is diffused to a minimum extent on arrival at 35 to 40 degrees to the normal to the lower surface (i.e. the normal to the general "plane" of the material) but is diffused more strongly after reflection at the reflective coating, during the return passage through the diffusing material. These differences in diffusion and intensity are clearly shown in FIG. 4 where intensity and angle or view resulting from different light entry angles are compared. Thus, FIG. 4 shows the characteristics of a planar sheet of graded refractive index light diffusing material. Graph A was derived by directing a beam of light through such sheet of material, arranged perpendicular to the beam axis and measuring the intensity of light (plotted along the Y-axis) emerging from the sheet on the opposite side thereof along directions at various angles (plotted along the X axis) from the beam axis. Graph B was produced in the same way but with the sheet of graded refractive index diffusing material arranged with the normal to its plane angled at 35° with respect to the beam axis.

Whilst, in some of the embodiments described above, the graded refractive index features responsible for the diffusion of light are formed integrally with the material affording the stepped or faceted surface, in other embodiments within the scope of the invention the device is formed as a plurality (e.g. two, three or more) of distinct, superimposed layers, with one such layer, preferably. an outer layer, being of a transparent material of uniform refractive index but provided with the ramped or faceted refractive surface and another such layer, for example juxtaposed with the layer with the faceted surface, incorporating the giraded refractive index features.

In embodiments such as shown in FIGS. 2, 2a, 3, 3a, and 3b in which light may pass entirely through the stepped or ribbed surface, rather than being reflected at that surface, the stepped surface of the material 13, 32, or 42 may be covered by a layer of a transparent material with a refractive index significantly different from that of the material 13, 32 or 42, the covering material intimately conforming to the stepped or ribbed surface, without air-gaps and thus completely filling the grooves defined between adjacent steps or ribs, the covering material further providing, as its surface remote from the stepped or ribbed surface, a smooth planar surface of the resulting device which will, for example, make it easier to keep free from dust and dirt and facilitate lamination with other planar surfaces, eg. of parts of LCD or other displays. A similar technique for providing a device having planar surfaces whilst retaining optical effects due to predetermined surface configurations of light transmitting layers is disclosed in GB-A-2314943, to which reference should be had.

What is claimed is:

1. An LCD display having a cover plate with an overlay comprising an element of light-transmitting material having a surface thereof configured to form a stepped or ribbed light refracting and/or reflecting element, said element of light-transmitting material incorporating an array of graded refractive index features adapted to impart light dispersing or diffusing characteristics to said light-transmitting material, or the element of light-transmitting material having a layer configured to form said stepped or ribbed surface and an additional layer incorporating said array of graded refractive index features.

2. The LCD display according to claim 1, wherein the stepped or ribbed surface of said element of light-transmitting material is covered with a second material of a refractive index significantly different from that of the first-mentioned light transmitting material, the second material providing a smooth, generally planar surface.

3. The LCD display according to claim 1, wherein said graded refractive index features are of a size which is small in relation to the spacing between adjacent steps or ribs of the stepped or ribbed surface of said element of light-transmitting material.

4. The LCD display according to claim 1, wherein said element of light-transmitting material has the general form of an extended, generally planar sheet or layer, and said graded refractive index features each have an axis extending through said planar sheet or layer from one side of said generally planar sheet or layer to the other, each said graded refractive index feature having a graded refractive index distribution, in a plane perpendicular to said axis, which is substantially the same in different such parallel planes at successive respective positions along said axis.

5. The LCD display according to claim 4, wherein each said axis extends perpendicular to the plane of said planar sheet or layer.

6. The LCD display according to claim 4, wherein at least some said axes are inclined with respect to the plane of said planar sheet or layer.

7. The LCD display according to claim 4, wherein each said graded refractive index features is a lens having an optical axis corresponding to the first-mentioned axis thereof, the refractive index within said structure being substantially constant along a line parallel with said axis and varying with distance from said axis.

8. The LCD display according to claim 4, in which the stepped or ribbed surface is covered with a second material of a refractive index significantly different from that of the first-mentioned light transmitting material, the second material providing a smooth, generally planar surface.

9. The LCD display according to claim 1, wherein, on said stepped or ribbed surface, the steps or ribs are of saw-tooth form.

10. The LCD display according to claim 9, in which the corresponding surfaces of adjacent steps or ribs are generally parallel so that the stepped surface is a Fresnel-type surface.

11. An LCD display including a liquid crystal cell and, behind the liquid crystal cell, an element of light-transmitting material having a surface thereof configured to form a stepped or ribbed light refracting and/or reflecting element, said element of light-transmitting material incorporating an array of graded refractive index features adapted to impart light dispersing or diffusing characteristics to said light-transmitting material, or the element of light-transmitting material having a layer configured to form said stepped or ribbed surface and an additional layer incorporating said array of graded refractive index features, wherein the surface of said light-transmitting material furthest from the liquid crystal cell is coated with light-reflecting material.

12. The LCD display according to claim 11, wherein the coating of light-reflecting material is such that the coated surface is partly light reflecting and partly light transmitting.

13. The LCD display according to claim 12, wherein the stepped or ribbed surface of said element of light-transmitting material is covered with a second material of a refractive index significantly different from that of the first-mentioned light transmitting material, the second material providing a smooth, generally planar surface.

14. The LCD display according to claim 11, wherein the stepped surface is coated with light-reflecting material.

15. The LCD display according to claim 11, wherein the stepped or ribbed surface of said element of light-transmitting material is covered with a second material of a refractive index significantly different from that of the first-mentioned light transmitting material, the second material providing a smooth, generally planar surface.

16. The LCD display according to claim 11, wherein said graded refractive index features are of a size which is small in relation to the spacing between adjacent steps or ribs of the stepped or ribbed surface of said element of light-transmitting material.

17. The LCD display according to claim 11, wherein said element of light-transmitting material has the general form of an extended, generally planar sheet or layer, and said graded refractive index features each have an axis extending through said planar sheet or layer from one side of said generally planar sheet or layer to the other, each said graded refractive index feature having a graded refractive index distribution, in a plane perpendicular to said axis, which is substantially the same in different such parallel planes at successive respective positions along said axis.

18. The LCD display according to claim 11, wherein, on said stepped or ribbed surface, the steps or ribs are of saw-tooth form.

19. The LCD display according to claim 18, in which the corresponding surfaces of adjacent steps or ribs are generally parallel so that the stepped surface is a Fresnel-type surface.

* * * * *

UNITED STATES PATENT AND TRADEMARK OFFICE
CERTIFICATE OF CORRECTION

PATENT NO. : 6,724,535 B1
DATED : April 20, 2004
INVENTOR(S) : Robin Clabburn It is certified that error appears in the above-identified patent and that said Letters Patent is hereby corrected as shown below:

<u>Column 8,</u>
Line 18, "according to claim 12" should read -- according to claim 11 --.
Line 26, "according to claim 11" should read -- according to claim 12 --.

Signed and Sealed this

Seventh Day of September, 2004

JON W. DUDAS
*Director of the United States Patent and Trademark Office*